United States Patent [19]

Novikoff

[11] 4,326,198
[45] Apr. 20, 1982

[54] METHOD AND APPARATUS FOR THE PROMOTION OF SELECTED HARMONIC RESPONSE SIGNALS IN AN ARTICLE DETECTION SYSTEM

[75] Inventor: Eugene B. Novikoff, Woodbury, N.Y.

[73] Assignee: Knogo Corporation, Hicksville, N.Y.

[21] Appl. No.: 715,568

[22] Filed: Aug. 18, 1976

[51] Int. Cl.³ .................. G01R 29/08; G08B 21/00
[52] U.S. Cl. ............................... 340/572; 324/260; 343/867
[58] Field of Search .......... 340/258 R, 258 C, 280; 343/101, 100 AP, 866, 867; 324/41, 43 R, 260, 262; 179/82

[56] References Cited

U.S. PATENT DOCUMENTS

| | | | |
|---|---|---|---|
| 1,971,549 | 8/1934 | Woodward | 340/258 C |
| 3,218,638 | 11/1965 | Honig | 343/6.5 |
| 3,292,080 | 12/1966 | Tricklis | 324/41 |
| 3,423,674 | 1/1969 | Goldsmith et al. | 324/45 |
| 3,493,955 | 2/1970 | Minasy | 340/258 |
| 3,631,442 | 12/1971 | Fearon | 340/258 R |
| 3,665,449 | 5/1972 | Elder et al. | 340/280 |
| 3,673,437 | 6/1972 | Wright | 307/252 J |
| 3,812,484 | 5/1974 | Miller et al. | 340/258 C |
| 3,919,704 | 11/1975 | Williams | |
| 3,971,981 | 7/1976 | Nakagone et al. | 324/43 R |
| 3,983,552 | 9/1976 | Bakeman, Jr. et al. | 340/280 |
| 3,990,065 | 11/1976 | Purinton et al. | 340/280 |

FOREIGN PATENT DOCUMENTS

| | | | |
|---|---|---|---|
| 4838272 | 1/1972 | Australia | |
| 8546275 | 3/1975 | Australia | |
| 972846 | 8/1975 | Canada | 340/258 C |
| 763681 | 5/1934 | France | 340/258 |

Primary Examiner—John W. Caldwell, Sr.
Assistant Examiner—Joseph E. Nowick
Attorney, Agent, or Firm—Fitzpatrick, Cella, Harper & Scinto

[57] ABSTRACT

An electromagnetic article detection system of the type wherein a saturable magnetic target generates harmonics of an alternating magnetic interrogation field. A magnetic bias means is provided along with the magnetic interrogation field to promote the production of target response particularly at even harmonics, throughout the interrogation region.

27 Claims, 7 Drawing Figures

METHOD AND APPARATUS FOR THE PROMOTION OF SELECTED HARMONIC RESPONSE SIGNALS IN AN ARTICLE DETECTION SYSTEM

BACKGROUND OF THE INVENTION

1. Field of the Invention

This invention relates to electromagnetic detection systems and more particularly it concerns novel arrangements which provide improved performance from such systems.

2. Description of the Prior Art

The prior art electromagnetic detection systems to which the present invention applies are shown and described in French Pat. No. 763,681 issued on Feb. 19, 1934 to Pierre Arthur Picard. As disclosed in that patent, an article to be detected, e.g., a library book, is provided with a target or marker of a special saturable magnetic material, such as permalloy. A large coil is arranged near a doorway or other egrees passageway leading from the area where the article to be detected is kept. This coil is energized with an alternating electrical signal so that it produces a corresponding alternating interrogation magnetic field in the region of the doorway. When the book bearing the permalloy marker passes through the alternating interrogation magnetic field, as when it is carried out through the doorway, the permalloy marker converts a portion of the alternating interrogation magnetic field energy to other alternating magnetic fields at various harmonics of the frequency of the fundamental or interrogation magnetic field. Selected ones of these harmonics are detected in the receiver; and when these harmonics are detected an alarm is sounded.

SUMMARY OF THE INVENTION

The present invention provides improvements to electromagnetic detection systems of the aforementioned type.

According to the present invention there is provided, in association with an interrogating magnetic signal in an interrogation zone, an additional bias magnetic field which is configured to coincide with the pattern of the interrogating magnetic field. This bias field, moreover, varies in intensity throughout the interrogation zone in the same manner as the interrogating magnetic field so that the ratio of intensity of magnetic bias field to magnetic interrogation field at every location and orientation throughout the interrogation zone is generally the same. It has been found that the magnetic bias field herein described, provides improved response, particularly at even harmonics, for targets are various locations and orientations throughout the interrogation zone.

The aforementioned French Pat. No. 763,681 to Picard further discloses that target signal responses at even harmonics of an interrogation signal frequency can be obtained when a magnetic bias field is applied to a target; and Picard describes the provision of a magnetized metal part on the protected article to achieve this effect. This generation of responses at even harmonics, as disclosed by Picard, is advantageous because innocent objects, which are not targets, are less likely to generate responses at even harmonics than at odd harmonics.

It has also been found that the earth's magnetic field itself can be used to provide the necessary bias so that the thin permalloy or similar target produces responses at even harmonics. However, when one utilizes the earth's magnetic field for this purpose, the target, in contrast to Picard's method, must be sufficiently aligned with such field.

The present invention provides an improved way of applying a magnetic bias to a permalloy or similar target. The magnetic bias provided by the present invention, moreover, enhances target responses. It provides the requisite magnetic bias, independent of the earth's magnetic field as suggested by Picard, to achieve target response at even harmonic; and, in addition, it maintains a nearly uniform ratio between signal and bias intensities on the target thereby improving both even and add harmonic target responses.

The magnetic bias field of the present invention is preferably generated by providing a magnetic bias coil of the same dimension size and shape as the interrogation magnetic field generating coil and positioned to lie adjacent to it. A direct current is supplied to the bias coil so that the coil produces a magnetic bias field which has the same pattern as the interrogation magnetic field. Also the magnetic bias field varies in intensity throughout the interrogation zone in a manner which corresponds generally to the variation in the intensity of interrogation magnetic field throughout the zone. Thus, at each location and orientation throughout the interrogation zone, the magnetic bias field is in the same direction as the interrogation field at that location and direction; and it has a fixed intensity relationship to the interrogation field.

In one embodiment of the present invention there is provided a first novel arrangement for preventing energy from the interrogation magnetic field coil from being directed, through induction, into the bias coil and short circuitry into the filters to which it is connected. According to this embodiment there are provided two closely spaced coplanar interrogation magnetic field generating coils arranged additively i.e., so that the magnetic fields generated by each are in the same direction; and there are also provided two closely spaced coplanar bias magnetic field generating coils arranged subtractively i.e., so that the magnetic fields generated by each are in opposite directions. Any electrical signals induced into one of the bias coils from the interrogation coils will be cancelled by similar but oppositely directed electrical signals induced into the other bias coil.

According to a still further embodiment of the invention there is provided a second novel arrangement for preventing diversion of energy from the interrogation coil into the bias coil and associated filter means. This second novel arrangement includes the provision of a capacitor and a coil connected in series to receive signals from the interrogating signal power supply. The bias coil is connected between the output of a direct current power supply and a junction between the capacitor and coil. Electrical signals induced into the bias coil from the interrogation coil are cancelled by the signals supplied to it from the interrogating signal power supply through the capacitor and coil. Phase and amplitude adjustment means may be provided between the interrogating signal power supply and the capacitor and coil to ensure that precise cancellation can occur.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the purposes of this invention. It is important, therefore, that this disclosure be regarded as including such equivalent arrangements as do not depart from the spirit and scope of the invention.

BRIEF DESCRIPTION OF THE DRAWINGS

Several embodiments of the invention have been chosen for purposes of illustration and description, and are shown in the accompanying drawings forming a part of the specification, wherein:

FIG. 1A is a circuit diagram illustrating a modification to one portion of the system of FIG. 1;

FIG. 5 is an exploded perspective view showing details of the antenna arrangement of FIG. 4.

DETAILED DESCRIPTION OF THE PREFERRED EMBODIMENTS

Figure 1:
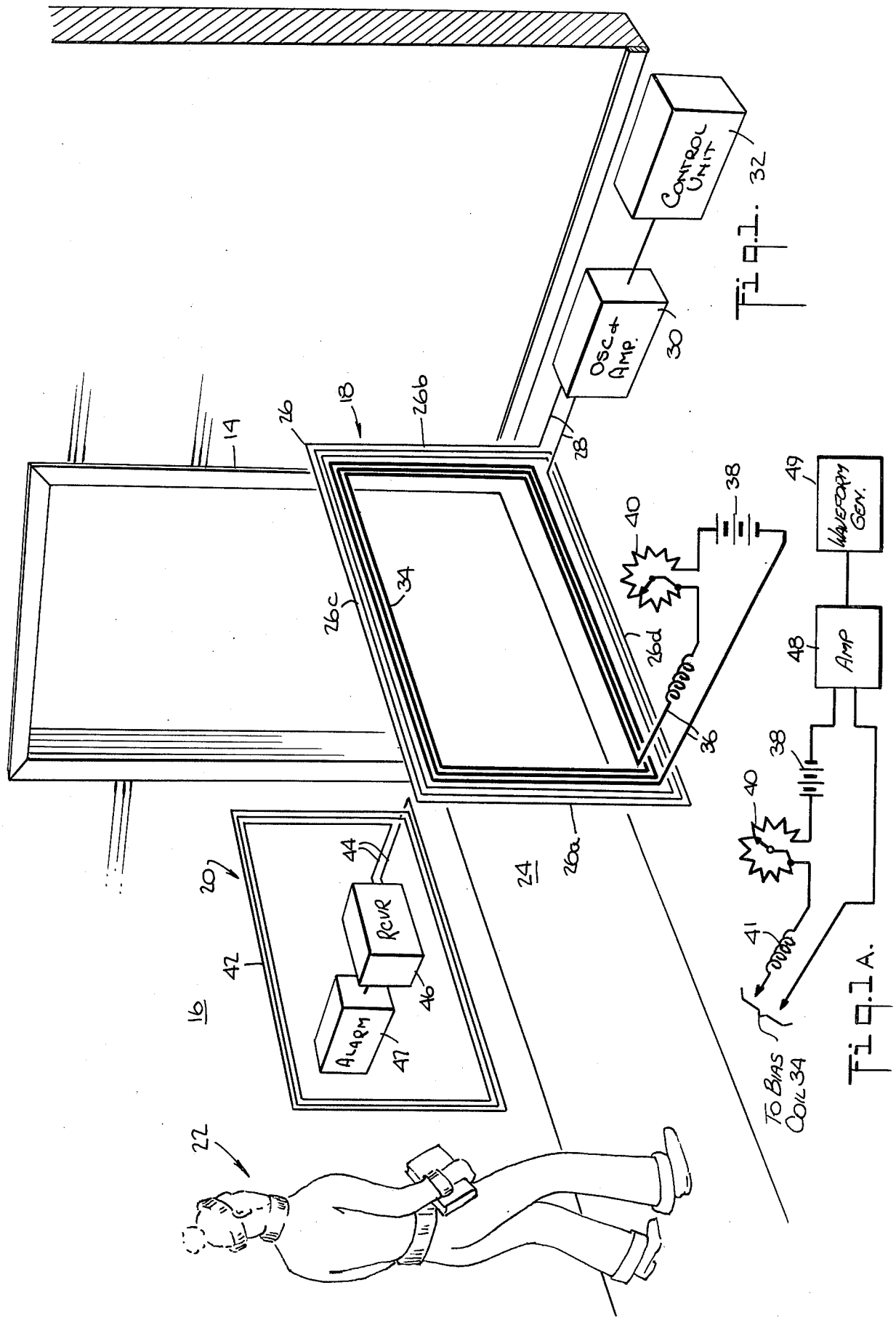
FIG. 1 is a perspective view, partially in schematic form, of an article detection system installation on which the present invention is embodied.

The article detection system installation of FIG. 1 may be located, for example, in a library to protect against the unauthorized removal of books, records, etc. from the library premises. In such case, the article to be protected is provided with a target or marker which comprises a thin elongated strip of easily saturable magnetic material such as permalloy. The target or marker, which may be hidden on the article to be protected may have a length of about seven inches (18 cm.), a width of one eighth inch (0.32 cm.) and a thickness of about one thousandth of an inch (0.25 mm.).

Figure 2:
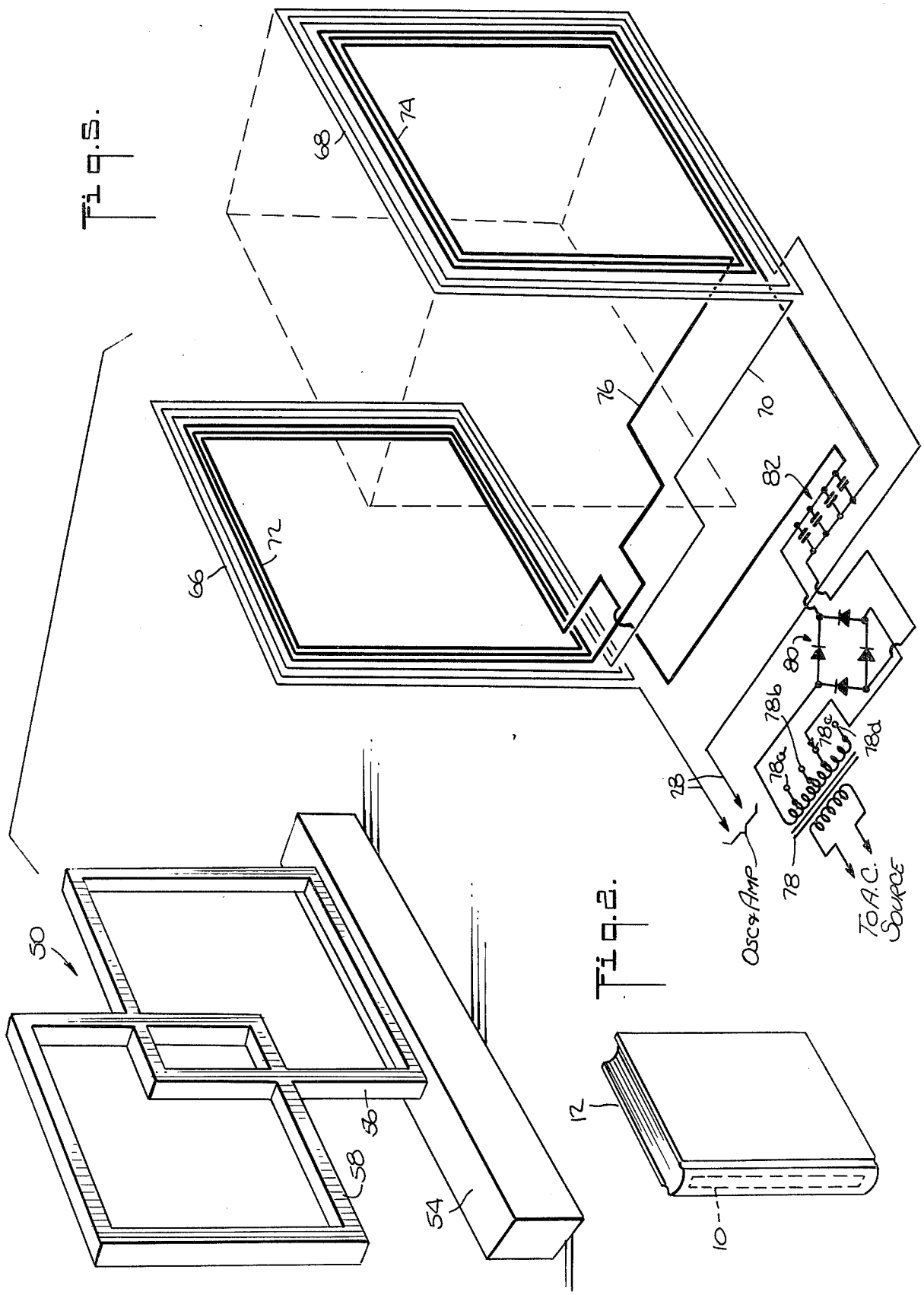
FIG. 2 is a perspective view of a book outfitted with a target or marker to enable it to be detected by the system of FIG. 1.

FIG. 2 illustrates the positioning of a target or marker 10 (shown in dotted outline) along the spine of a book 12 to protect it. Marker 10 is preferably of permalloy material as disclosed in the aforesaid French Pat. No. 763,681.

Reverting now to FIG. 1, there is shown a doorway 14 which forms an egress passageway from a protected area such as a library reading room 16. A pair of large antenna clusters, comprising a transmitting cluster 18 and a receiving cluster 20, are positioned in the reading room 16 adjacent to and on opposite sides of the doorway 14. The antenna clusters 18 and 20 are arranged in parallel planes; and when a patron, 22 exits from the reading room 16 through the doorway 14, he must pass between the antenna clusters 18 and 20. The region between the antenna clusters 18 and 20 constitutes an interrogation zone 24 and the electromagnetic effects produced by and on the system, as will be described hereinafter, take place primarily in the interrogation zone. Thus, when the book 12 carrying the marker 10 (FIG. 2) is carried by the patron 22 through the interrogation zone 24, the marker 10 will react electromagnetically with the detection system to produce an alarm; however no interaction and no alarm will be produced when the targeted book is at other locations in the reading room 16 away from the interrogation zone 24, and no alarm will be produced when other article, which are not protected with a special target or marker, pass through the interrogation zone.

The transmitter antenna cluster 18 includes a flat, essentially rectangular interrogation coil 26 made up of several turns of insulated electrically conductive wire. Panel or support means (not shown) may be provided to hold the interrogation coil in place. The ends of the interrogation coil 26 are connected via leads 28 to an oscillator and amplifier 30; and this in turn is connected to be controlled by a control unit 32. The oscillator and amplifier serve to supply alternating electrical current of essentially single frequency to the interrogation coil 26. The present invention is not concerned with the details of this component and accordingly in the interest of clarity those details will not be described herein. Devices for supplying alternating electrical current to a coil are well known and one such device is described in the aforementioned French Pat. No. 763,681 to Picard. Similarly, the details of the control unit 32 are not essential to the present invention and in the interest of clarity these will not be described. Essentially the control unit 32 serves to turn the oscillator and amplifier on and off; for example, when the patron 22 approaches the interrogation zone 24 some switching means, such as a photoelectric system, or a pressure sensitive switch on the floor (not shown) may be activated by passage of the patron into the interrogation zone and the control unit 32 will respond to this switching means to turn on the oscillator and amplifier 30.

The transmitter antenna cluster 18 also includes a flat, essentially rectangular bias coil 34 also made up of several turns of insulated electrically conductive wire. The bias coil is of essentially the same size and shape as that of the interrogation coil 26 and it is mounted to nest within or lay against the interrogation coil 26. For purposes of illustration the bias coil 34 is shown to lie within the transmitter coil; however any arrangement which places the bias coil so that it closely follows the size, shape and location of the transmitter coil will suffice. The ends of the bias coil 34 are connected via leads 36 to a direct current bias source such as a battery 38 and to a current control device such as a rheostat 40 in series with the coil and battery. A linear choke coil 41 is arranged in series with the battery 38 to protect against circulation of alternating currents induced from the interrogation coil 26.

The receiving antenna cluster 20 is made up of a receiver coil 42 which may be similar in configuration to that of the interrogation and bias coils 26 and 34, but located on the opposite side of the interrogation zone 24 from those coils. The ends of the receiver coil 42 are connected via leads 44 to a receiver 46; and this in turn is connected to an alarm 47. The receiver 46 may be any device capable of detecting selected signals on the leads 44 which are produced by electromagnetic disturbances in the interrogation zone 24 acting on the receiver coil 42. More particularly, the receiver 46 is tuned to produce an output signal when the electromagnetic disturbances acting on the reciever coil 42 include frequencies which are at some one or more selected harmonics of the frequency of the oscillator and amplifier 30. The alarm 47 may be any device capable of producing an audio or visual output, such as the ringing of a bell or the lighting of a light, in response to outputs from the receiver 46. Means (not shown) may also be provided to lock a door or turnstile in the path of the interrogation zone when the receiver 46 produces an alarm acutating output.

The present invention does not rely upon the specific details of the receiver 46 and the alarm 47 and for purposes of simplicity and clarity those details have been omitted, suffice it to say that suitable receiver and alarm means are already described and shown in detail in the aforementioned French Pat. No. 763,681 to Picard.

In operation of the detection system, the control unit 32 causes the oscillator and amplifier 30 to supply alternating electrical current to the interrogation coil 26 and this in turn produces an alternating magnetic interrogation field in the interrogation zone 24. In the presently preferred system the frequency of the magnetic interrogation field, i.e. the fundamental frequency, is 2.5 kilohertz. The receiver is not tuned to the fundamental 2.5 kilohertz frequency but instead it is tuned to some selected harmonic of that frequency, preferably an even harmonic such as the sixth (i.e. fifteen kilohertz). Now when a patron 22 brings a protected article, such as the book 12 into the interrogation zone 24, the permalloy target 10 (FIG. 2) on the book will convert a portion of the energy of the alternating magnetic interrogation field, which is incident upon it, to other alternating magnetic fields at frequencies which are harmonics of the fundamental frequency (2.5 kilohertz).

It has been found that a thin strip of permalloy will produce a much larger amplitude sixth harmonic under these conditions than other materials and accordingly by monitoring for signals at the sixth harmonic of the fundamental frequency it is possible to detect only those articles which have been specially marked or targeted with the permalloy strips. This sixth harmonic detection is achieved by providing appropriate frequency filtering means in association with the receiver coil 42 and the receiver 46. Such filtering means are well known and suitable means are shown and described in the above identified French Pat. No. 763,681 to Picard.

As can be seen in FIG. 1 the rectangularly shaped interrogation coil 26 includes first and second vertical lengths 26a and 26b and upper and lower horizontal lengths 26c and 26d. Each of these lengths produces circular magnetic fields in the interrogation zone 24 and the vector sum of these fields constitute the magnetic field at each location in the zone produced by the interrogation coil 26. It will thus be appreciated that the magnetic field orientation and intensity produced by the coil 26 is different at each location in interrogation zone.

Figure 3:
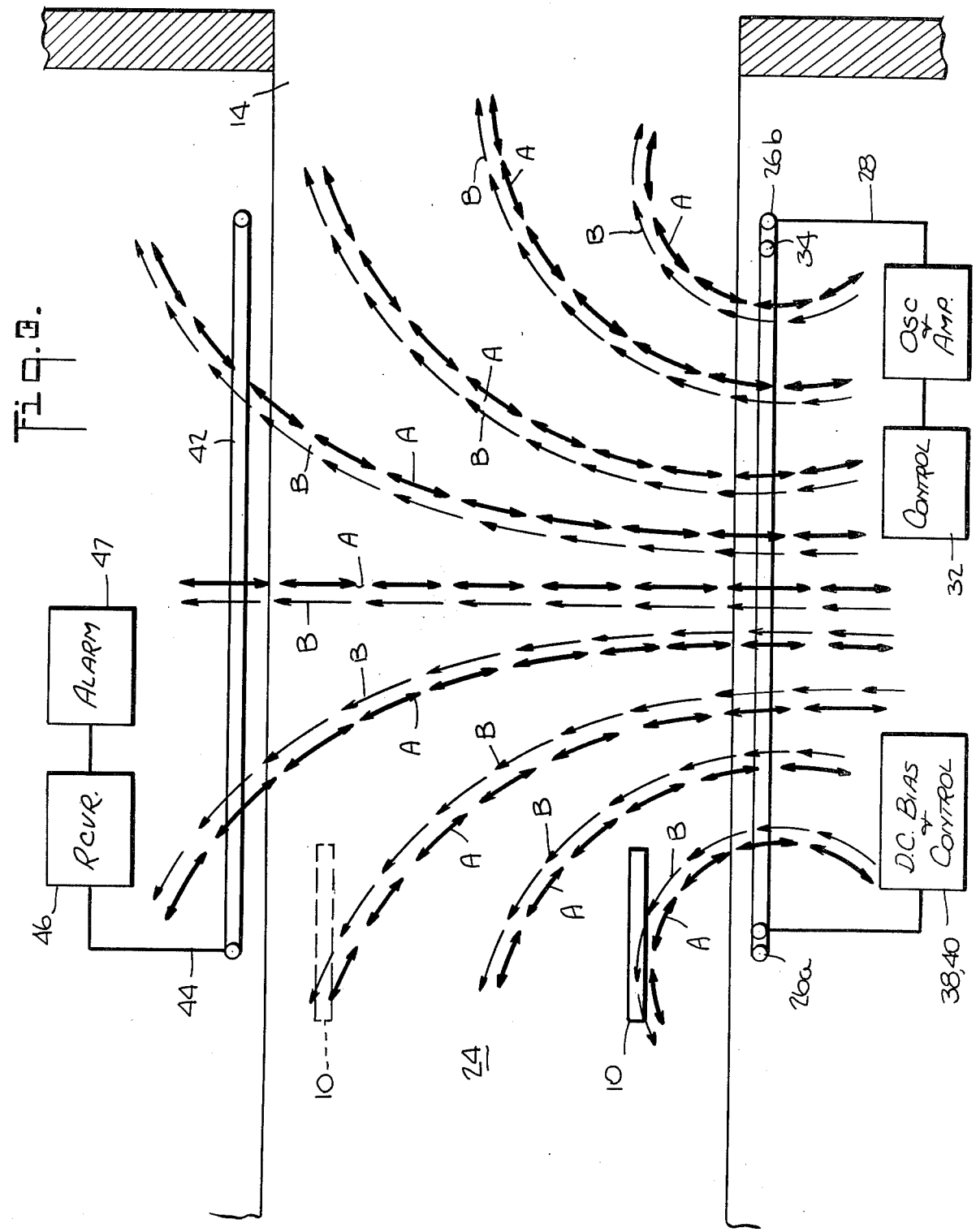
FIG. 3 is a plan view of the article detection system installation of FIG. 1 showing, in idealized fashion, certain magnetic field components present in operation of the system.

An idealized version of the magnetic field patterns produced by the electrical currents flowing in the first and second vertical wires 26a and 26b of the interrogation antenna 26 are shown in FIG. 3. These fields are illustrated by the double arrows A extending along arcs which are centered on the wires 26a and 26b. The arrows are doubled in direction to indicate the reversal of direction of the magnetic field as the alternating electrical current in the coil 26 reverses direction.

When the target 10 is aligned along the direction of its movement through the interrogation zone 24 it becomes aligned with the direction of the magnetic field produced by the vertical wires 26a when it is approximately on a line extending from them directly across the zone as shown in FIG. 3. When the target is positioned closer to the wires 26a where the magnetic field is stronger (solid outline location) it will provide a greater response than it will when it is positioned across the zone where the magnetic field is weaker (dashed outline location).

The bias system of the present invention comprising the bias coil 34 and the means for supplying direct current of predetermined value through the coil, serves to improve response to the target 10. The bias coil 34, as shown in FIG. 1, is nested with and follows the configuration of the interrogation coil 26. Thus the pattern of the magnetic field produced by the bias coil 34 follows that of the interrogation coil 26. The magnetic field components produced by the bias coil which correspond with the magnetic field components A produced by the interrogation coils are shown by the single arrows B in FIG. 3. As can be seen, these components correspond in shape and orientation to the interrogation magnetic field components; and although the intensity of the bias magnetic field components may not be the same as that of the interrogation magnetic field components, their decrease in intensity away from the interrogation and bias coils 26 and 34 follows that of the interrogation magnetic field components. In fact, the ratio between the intensity of the interrogation magnetic field and the bias magnetic field is essentially constant throughout the interrogation zone.

The arrows B, which represent the bias magnetic field components, are shown single to indicate that the bias magnetic field is unidirectional.

It has been found that for detection of responses at the sixth harmonic of the interrogation field frequency good uniformity of response can be obtained by maintaining the bias magnetic field strength at about twenty five percent of the interrogation magnetic field strength (root mean square value).

In some instances, especially where several harmonics are to be detected, it may be desirable to use a magnetic bias which varies at a predetermined rate substantially less than the frequency of the interrogation signal but at least high enough so that a sweep through a given bias range can be effected in the period of time during which a target or marker passes through the interrogation zone. FIG. 1A shows an arrangement for carrying out this bias sweep. As shown therein there is provided in circuit with the battery 38, the rheostat 40 and the choke coil 41, an amplifier 48 and a waveform generator 49. The waveform generator 49 may be any electrical signal generator which produces an electrical output signal which varies in time in the same manner that it is desired to vary the magnetic bias field. Such waveform generators are well known to those skilled in the art. The amplifier 48 raises the level of the signal supplied by the waveform generator 49 and superimposes it on the bias supplied by the battery 38 thereby varying the bias current supplied to the magnetic bias coil 34.

Figure 4:
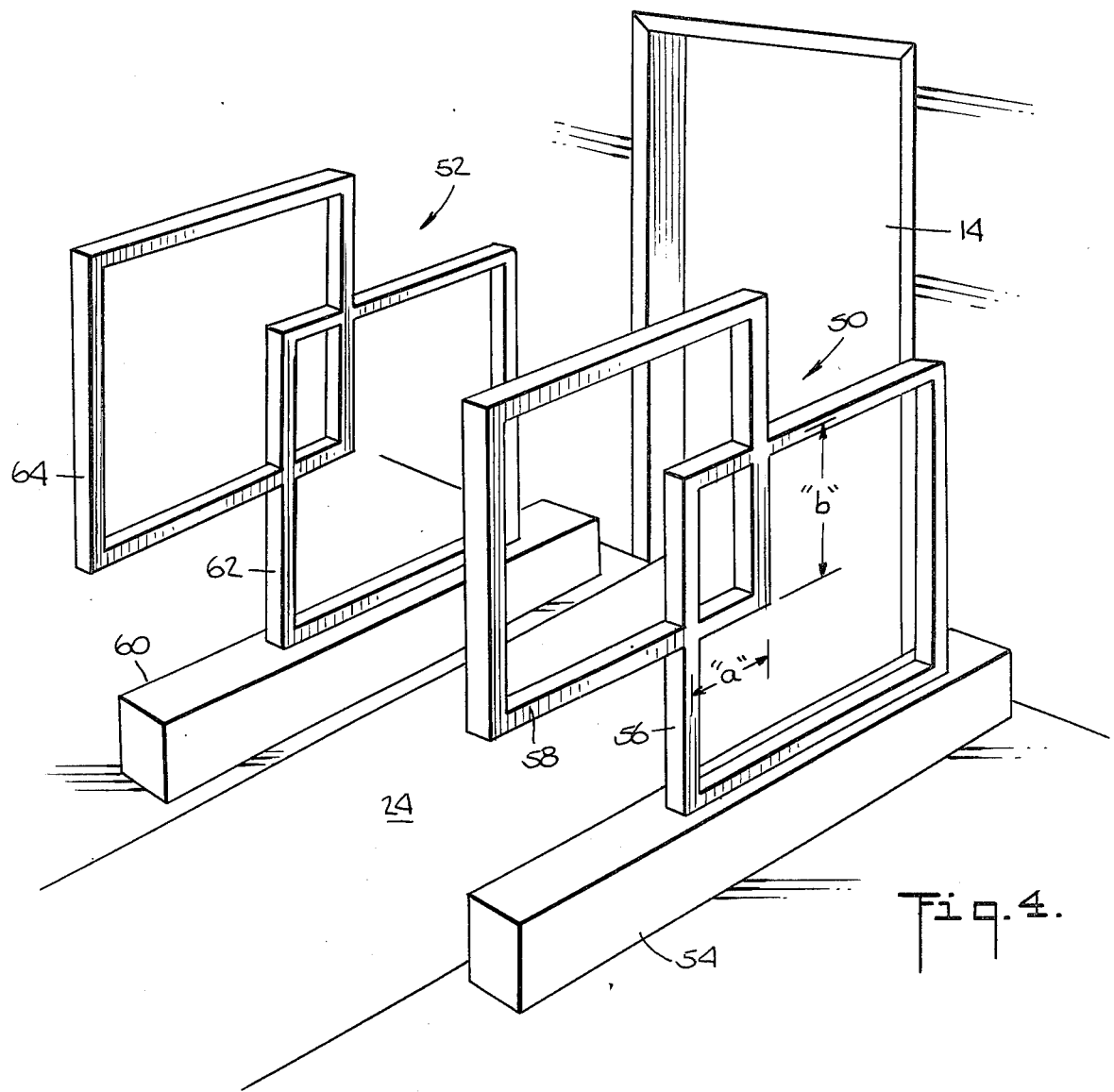
FIG. 4 is a perspective view similar to FIG. 1, but showing a presently preferred arrangement of antennas in the article detection system.

FIGS. 4 and 5 show an antenna arrangement which is presently preferred for carrying out the present invention.

As shown in FIG. 4 there is provided at opposite sides of the doorway 14, a transmitter antenna panel 50 and a receiver antenna panel 52 which correspond, respectively, to the transmitter and receiving antenna clusters 18 and 20 of FIG. 1. The transmitter antenna panel 50 comprises a rectangular box-like base 54 which extends along the floor and a pair of rectangular open frames 56 and 58 which are diagonally offset but partially intersect each other. The frames themselves are hollow and they provide enclosure and support for transmitter and bias coils to be described. The receiver panel is of similar construction and it also comprises a base 60 on which are mounted diagonally offset and partially intersecting open rectangular frames 62 and 64. The frames 62 and 64 provide enclosure and support for the receiver antenna coils.

The bases 54 and 60 on which the frames 56, 58, 62 and 64 are supported may be used to enclose various electrical components including the transmitter, bias, control, receiver and alarm portions of the system.

Turning now to the exploded view of FIG. 5 it will be seen that there are provided first and second interrogation coils 66 and 68 which correspond to and fit inside the rectangular open frames 56 and 58. The coils 66 and 68 are wound in the same direction and they are connected in series, as shown by a crossover line 70. The coils 66 and 68, as indicated, are connected via the leads 28 to the oscillator and amplifier 30 (not shown in FIG. 5). When the coils 66 and 68 are energized with alternating electrical current they produce alternating magnetic interrogation fields in the same manner as does the coil 26 of FIG. 1; however, the two partially intersecting rectangular coils of FIG. 5 provide an improved variation in magnetic field components of different orientation and better response for all possible exit paths and all possible target orientations in the interrogation zone 24.

There are also provided, as shown in FIG. 5, first and second bias coils 72 and 74 which also correspond to and fit inside the frames 56 and 58. The bias coils 72 and 74 are connected in series via a crossover line 76 but they are wound in opposite directions. The ends of the coils 72 and 74 are connected via the leads 36 to a direct current bias voltage supply and control. As shown in FIG. 5 the bias coils 72 and 74 receive direct current from a power supply comprising a transformer 78 connected to an alternating current source (not shown), a full wave rectifier 80 and a bank of capacitors 82 connected in parallel across the output of the rectifier 80. The secondary of the transformer 78 has a plurality of taps 78a, 78b, 78c and 78d therealong so that different values of bias current can be supplied to the bias coils 72 and 74. The capacitors 82 are quite large, e.g., in the neighborhood of four thousand seven hundred microfarads to provide sufficient filtering so that an essentially constant direct current flows through the bias coils.

Although the interrogation coils 66 and 68 are wound in the same direction while the bias coils 72 and 74 are wound in opposite directions, the effect of each bias coil on its associated interrogation coil is substantially the same as in the preceeding embodiment. This is because the direction of a direct current magnetic bias is effectively the same with respect to an alternating magentic field whether the direct current bias is in the forward or the reverse direction. On the other hand, because the two bias coils are wound in opposite directions the electrical induction produced in one bias coil by its associated interrogation coil will be effectively cancelled by the electrical induction effects produced in the other coil. Consequently little, if any, energy is lost due to the presence of the bias coils.

In the presently preferred arrangement the frames 56 and 58, and the interrogation and bias coils 66, 72 and 68, 74 which are mounted in them are square and extend approximately thirty inches (75 cm.) along each side and they overlap by about ten inches (25 cm.) in the horizontal direction (dimension "a") and about fifteen inches (38 cm.) in the vertical direction (dimension "b"). The interrogation coils 66 and 68 preferably each comprise fifty two turns of #12 wire while the bias coils 72 and 74 each comprise thirty turns of #20 wire. The oscillator and amplifier 30 are normally driven to produce a peak to peak current in the coils 66 and 68 of about ten amperes or an rms (root mean square) value of three and one half ampere. The bias control in turn is arranged to produce a current flow through the bias coils 72 and 74 of about two amperes. These current flows in the interrogation coils is designed to provide a magnetic interrogation field which varies from a maximum of about ten oersteds (root mean square value) near the interrogation and bias coils in a direction perpendicular to their plane and extending across the interrogation zone, to a minimum of about one oersted across the interrogation zone at the receiver antenna panel 52. Similarly, the current flow in the bias coils is designed to provide a bias field intensity which is roughly twenty five percent of that of the interrogation field. This serves to provide sufficient bias throughout the interrogation zone.

The frames 62 and 64 of the receiver antenna panel 52 are of about the same size and arrangement as the frames 56 and 58 of the transmitter antenna panel 50. Also a pair of receiver coils (not shown) of essentially the same configuration and arrangement as the interrogation coils 66 and 68 are housed in the frames 62 and 64. Other receiver antenna arrangements may also be employed using one or several coils.

Figure 6:
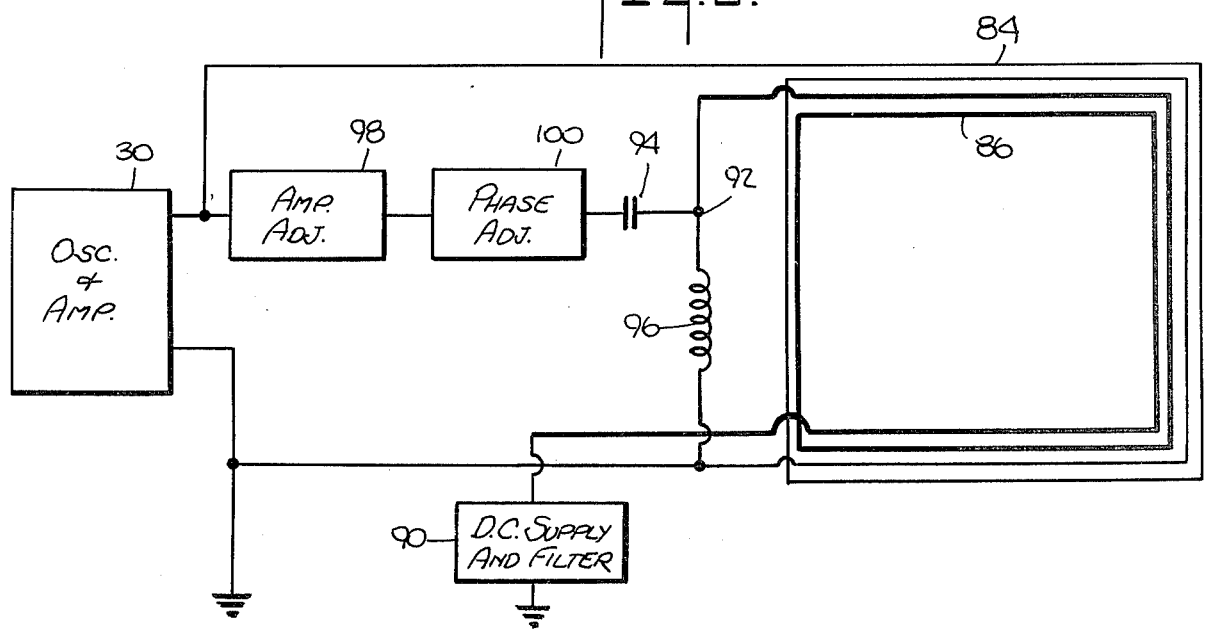
FIG. 6 is a schematic diagram showing a modified arrangement for energizing the antennas of FIG. 5.

FIG. 6 shows an alternate arrangement for connecting the bias coil. As shown in FIG. 6 an interrogation coil 84 and a bias coil 86 are shown in nested arrangement. The interrogation coil 84 is connected to be energized also from the oscillator and amplifier 30 shown in the preceeding embodiments. The bias coil 86 is connected at one end to a direct current supply and filter 90 which may be similar to that shown in FIG. 5. The other end of the bias coil 86 is connected to a junction 92 between a capacitor 94 and a coil 96. The capacitor and coil 94 and 96 are connected in series, along with phase and amplitude adjustment means 98 and 100, between the output of the oscillator and amplifier 88 and ground.

In operation of the arrangement shown in FIG. 6, the electrical signals induced into the bias coil 86 from the interrogation coil 84 are effectively cancelled by the voltage variations produced at the junction 92 between the capacitor 94 and the coil 96. The amplitude and phase adjustment means 98 and 100, which may be any of several known electrical circuits for producing amplitude and phase adjustments of oscillating electrical signals, can be adjusted to achieve precise synchronization between the signals induced from the interrogation coil and the signals supplied through the junction 92 so that essentially complete cancellation can be obtained.

While especially good results are obtained with the bias coils described herein, other magnetic biasing schemes could also be employed, for example, permanent magnet means arranged to obtain a magnetic bias of the same pattern as is obtained with the bias coils.

Having thus described the invention with particular reference to the preferred forms thereof, it will be obvious to those skilled in the art to which the invention pertains, after understanding the invention, that various changes and modifications may be made therein with- out departing from the spirit and scope of the invention as defined by the claims appended hereto.

What is claimed and desired to be secured by Letters Patent is:

1. Apparatus for detecting the presence of an article in an interrogation zone, said apparatus comprising a target formed of a strip of a saturable ferromagnetic material and adapted to be carried on said article, an enlarged, flat, planar interrogation antenna coil positioned adjacent to and extending along said interrogation zone, so that targets carried through said zone must pass through magnetic interrogation fields produced by said coil, electrical oscillator and drive means constructed and arranged to produce an interrogation signal at a first frequency, said interrogation antenna coil being electrically coupled to said electrical oscillator and drive means to produce a varying magnetic interrogation field at said first frequency throughout said interrogation zone, said varying magnetic field having a characteristic magnetic field pattern, magnetic bias means constructed and arranged to produce, throughout said interrogation zone a magnetic biasing field having a characteristic magnetic field pattern essentially the same as the characteristic magnetic field pattern of said varying magnetic interrogation field said magnetic bias means including a bias coil of substantially the same configuration as said interrogation antenna coil and positioned adjacent said interrogation antenna coil and means for supplying electrical current to said bias coil, said drive means, said interrogation antenna coil, and said magnetic bias means further being arranged such that the net magnetic fields produced thereby are capable, at each location throughout said interrogation zone, of causing said target to produce target signals in the form of magnetic fields which vary at frequencies harmonically related to said first frequency and receiver means constructed and arranged to detect the presence, in said interrogation zone of said target signals.

2. Apparatus according to claim 1 wherein said magnetic bias means is constructed and arranged to produce said magnetic biasing field with an intensity which forms a fixed ratio with the magnetic field produced by said interrogation antenna coil throughout said interrogation zone.

3. Apparatus according to claim 1 wherein said varying magnetic interrogation field has a characteristic intensity, as represented on a root mean square basis, which is different at different locations and orientations throughout said interrogation zone and wherein said magnetic bias means is constructed and arranged to produce a magnetic biasing field whose intensity at every location and orientation in said interrogation zone is substantially twenty five percent of said characteristic intensity.

4. Apparatus according to claim 1 wherein said interrogation antenna coil and said electrical oscillator and drive means are constructed and arranged to produce a varying magnetic interrogation field whose intensity, as represented on a root mean square basis, varies from a value of about ten oersteds on the side of said zone adjacent said interrogation antenna to a value about one oersted on the opposite side of said zone.

5. Apparatus according to claim 4 wherein said magnetic bias means is constructed and arranged such that a magnetic biasing field produced thereby has, at every location across said interrogation zone, an intensity which is about twenty five percent of the intensity, as represented on a root mean square basis, of the varying magnetic interrogation field being produced at such location by said interrogation antenna coil.

6. Apparatus according claim 1 wherein said bias coil is nested in said interrogation antenna coil.

7. Apparatus according to claim 1 wherein said receiver means is constructed and arranged to detect the presence, in said interrogation zone, of at least one selected alternating magnetic field which is at an even harmonic of the frequency of the magnetic field produced by said interrogation antenna coil.

8. Apparatus according to claim 1 wherein said interrogation antenna coil comprises a pair of mutually offset windings lying substantially in a common plane and connected in additive relationship and wherein said bias coil comprises a pair of electrical windings of the same configuration as and positioned adjacent to said interrogation antenna coil windings, said bias coil windings being connected in subtractive relationship.

9. Apparatus according to claim 8 wherein said means for supplying electrical current to said bias coil includes an electric filter.

10. Apparatus according to claim 8 wherein the means for supplying electrical current to said bias coil comprises means for receiving alternating electrical current, rectifying means for rectifying said current and filter means for removing alternating current components from the rectified current.

11. Apparatus according to claim 1 wherein said means for supplying electrical current to said bias coil comprises means for supplying direct electrical current to one end of said bias coil and compensating means supplying signals from said electrical oscillator and drive means to the other end of said bias coil at an amplitude and phase sufficient to cancel the signals induced into said bias coil from said interrogation antenna coil.

12. Apparatus according to claim 11 wherein said means for supplying direct electrical current to said one end of said bias coil includes electrical filter means.

13. A method of detecting the presence of an article in an interrogation zone, said method comprising the steps of attaching to said article a target of a saturable ferromagnetic material, carrying said article, with said target attached, through a magnetic interrogation field produced in an interrogation zone by an enlarged, flat planar interrogation antenna coil positioned adjacent to and extending along said interrogation zone while energizing said interrogation antenna coil to generate throughout said interrogation zone said magnetic interrogation field at a predetermined interrogation frequency, simultaneously driving electrical current through a bias coil which is of substantially the same configuration as and is positioned adjacent to said interrogation antenna coil to generate throughout said interrogation zone a magnetic biasing field, said magnetic biasing field having a configuration throughout said interrogation zone which is essentially the same as the configuration of said magnetic interrogation field, the combined interrogation and biasing fields being capable, at each location throughout said interrogation zone, of causing said target to produce target signals in the form of magnetic fields which vary at frequencies harmonically related to said predetermined frequency, monitoring said interrogation zone for the presence of said target signals at a selected harmonic of said predetermined frequency, and generating an alarm signal upon the detection of said target signals.

14. A method according to claim 13 wherein said magnetic bias field is generated to have an intensity which forms a fixed ratio with respect to said varying magnetic interrogation field throughout said interrogation zone.

15. A method according to claim 13 wherein said magnetic bias field is generated to have an intensity, at each location and orientation in said zone, of about twenty five percent of the intensity of the interrogation magnetic field, as represented on a root means square basis, at such locations and orientation.

16. A method according to claim 13 wherein said magnetic interrogation field is generated to have an intensity, as represented on a root mean square basis, which varies from a value of about ten oersteds on one side of said zone to a value of about one oersted on the opposite side of said zone.

17. A method according to claim 16 wherein said magnetic bias field is generated to have an intensity, at every location across said interrogation zone, of about twenty five percent of the intensity of said magnetic interrogation field, as represented on a root mean square basis, at such location.

18. A method according to claim 13 wherein said selected harmonic is an even harmonic of the frequency of said magnetic interrogation field.

19. A method according to claim 13 wherein said selected harmonic is the sixth harmonic of the frequency of said magnetic interrogation field.

20. A method according to claim 13 wherein said magnetic interrogation field is generated by driving electrical current through a pair of mutually offset interrogation windings lying substantially in a common plane said current being driven through each of said windings such that the magnetic fields produced by each are in the same direction and wherein said magnetic biasing field is generated by driving an electrical biasing current through a pair of mutually offset bias windings of the same configuration as and positioned adjacent to said interrogation windings, said biasing current being driven through said bias windings such that the magnetic fields produced by each are in opposite directions.

21. A method according to claim 20 where said driving of an electrical biasing current through said bias windings includes the step of filtering of said current.

22. A method according to claim 20 wherein said driving of an electrical biasing current through said bias windings includes the step of rectifying alternating electrical current and filtering the rectified current to remove alternating current components therefrom.

23. Apparatus according to claim 11 wherein said compensating means includes a capacitor and a coil connected in series across the output of said electrical oscillator and drive means and means connecting said other end of said bias coil to the junction between said capacitor and coil.

24. Apparatus according to claim 23 wherein said compensating means further includes means for adjusting the phase amplitude of signals between the output of said electrical oscillator and drive means and said capacitor.

25. A method according to claim 13 wherein the step of driving electrical current through a bias coil includes applying direct electrical current to said bias coil and simultaneously therewith applying alternating electrical signals to said bias coil at a frequency, amplitude and phase sufficient to cancel the effects of electrical induction into said bias coil by said interrogating magnetic field.

26. A method according to claim 25 wherein said alternating electrical signals are derived from signals generating said interrogation magnetic field, the derived signals being applied to a capacitor and a coil connected in series and the alternating electrical signals being directed to said bias coil from the junction between said capacitor and coil.

27. A method according to claim 13 wherein said magnetic bias field is slowly varied in a continuous manner over a given range as said article passes through said interrogation zone.

* * * * *

UNITED STATES PATENT AND TRADEMARK OFFICE
CERTIFICATE OF CORRECTION

PATENT NO. : 4,326,198
DATED : April 20, 1982
INVENTOR(S) : Eugene B. Novikoff

It is certified that error appears in the above—identified patent and that said Letters Patent is hereby corrected as shown below:

Column 1, line 21, "egrees" to read -- egress --;

Signed and Sealed this

Twelfth Day of October 1982

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,326,198

DATED : April 20, 1982

INVENTOR(S) : Eugene B. Novikoff

It is certified that error appears in the above-identified patent and that said Letters Patent is hereby corrected as shown below:

Column 1, line 21, "egrees" to read -- egress --.

Column 2, line 13, "add" to read -- odd --.

This certificate supersedes Certificate of Correction issued October 12, 1982.

Signed and Sealed this

Seventh Day of June 1983

[SEAL]

Attest:

DONALD J. QUIGG

Attesting Officer

Acting Commissioner of Patents and Trademarks